H. E. KNUDSON.
UDDER CLAMP FOR COWS.
APPLICATION FILED AUG. 12, 1912.
1,059,168.
Patented Apr. 15, 1913.
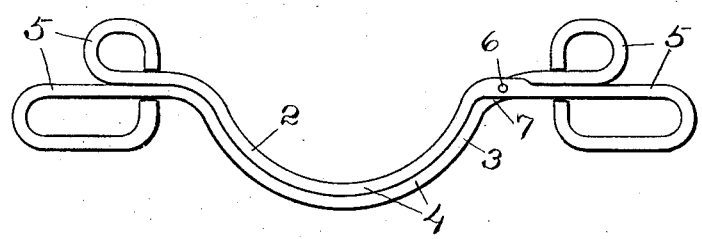
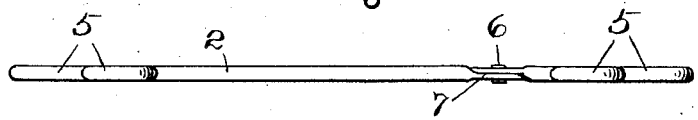
Witnesses
Stuart Hilder.
Frances M. Anderson.
Inventor
Henry E. Knudson
by E.W. Anderson & Son
his Attorneys

UNITED STATES PATENT OFFICE.

HENRY E. KNUDSON, OF ORFORDVILLE, WISCONSIN, ASSIGNOR OF ONE-HALF TO ALBERT G. HEYERDAHL, OF ORFORDVILLE, WISCONSIN.

UDDER-CLAMP FOR COWS.

1,059,168.  Specification of Letters Patent.  Patented Apr. 15, 1913.

Application filed August 12, 1912. Serial No. 714,650.

*To all whom it may concern:*

Be it known that I, HENRY E. KNUDSON, a citizen of the United States, resident of Orfordville, in the county of Rock and State of Wisconsin, have made a certain new and useful Invention in Udder-Clamps for Cows; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a perspective view of the invention as applied. Fig. 2 is a plan view of the invention. Fig. 3 is a side view of the invention.

The invention relates to means for relieving the udder of a cow when a teat is clogged or stopped up, and it consists in the novel construction and combinations of parts, as hereinafter set forth. When a teat is clogged so that the milk cannot pass out, this quarter of the udder becomes useless, and much milk is lost in this way.

In the drawings illustrating the instrument, which consists of a pair of double handled curved clamping rods pivoted together, the numeral 2 indicates one of the clamp rods and 3 the other. These rods are preferably made of heavy wire or rod metal, about one-third of an inch in diameter, and each rod consists of a bowed or bent portion 4, having at each end a handle 5, in loop form. The rods are pivoted together at 6, where the rods are flattened and cross each other, in such wise that the bows are parallel and come together along their length, the inner or concave side of the outer bow fitting against the outer or convex side of the inner bow. In this relation the handle loops at the free ends of the clamp rods are at the same side as the bows, while at their other ends the handle loops are at the opposite side. The flattened bearings 7 where the rods cross are located just beyond the ends of the bowed portions, so that when the bows are closed together the handles are also closed together. As designed to be used the handles at the pivot end of the instrument are designed for the right hand, while those at the free ends of the rods are for the left hand. The loop form of the handles gives the instrument a rounded form at its ends, and it is so formed in order to avoid injury to the udder in placing it in position for operation. The handle ends of the instrument when closed are set in line with each other so that it can be easily directed in placing it in position. The curvature of the bows may have a radius of about three or four inches, for good results, and the bows are designed to be in the same plane as the handles.

In use the instrument is first held by the operator with his right hand, grasping the loops near the pivot, and while he holds the milk in the teat with the left hand, the instrument is put on the teat above the milk and closed on the same. Then the operator takes his left hand from the teat and uses this hand to hold the instrument closed on the teat, in which action he grasps the free end loops at the other end of the instrument. The right hand being now taken from the instrument is used to manipulate the teat and force the little milk confined therein down through the teat. The curvature of the rods in their clamping position is designed to suit the curvature of the bag and facilitate the application of the instrument.

What I claim and desire to secure by Letters Patent is:

1. An udder clamp consisting of two clamping rods having loop handles at each end, in line with each other, and clamping portions between the loop handles, said rods crossing each other near the loop handles at one end and being pivoted to each other at the crossing bearings.

2. An udder clamp consisting of two clamping rods having loop handles at each end, in line with each other, and parallel curved clamping portions between the loop handles, said rods having crossing bearings near the loop handles at one end and a pivotal connection at the crossing bearings.

In testimony whereof I affix my signature, in presence of two witnesses.

HENRY E. KNUDSON.

Witnesses:
  CHAS. TAYLOR,
  ETHEL COMPTON.

---

Copies of this patent may be obtained for five cents each, by addressing the "Commissioner of Patents, Washington, D. C."